United States Patent
Zhu et al.

(10) Patent No.: US 12,189,960 B2
(45) Date of Patent: *Jan. 7, 2025

(54) LIMITING HOT-COLD SWAP WEAR LEVELING

(71) Applicant: Micron Technology, Inc., Boise, ID (US)

(72) Inventors: Fangfang Zhu, San Jose, CA (US); Ying Yu Tai, Mountain View, CA (US); Ning Chen, San Jose, CA (US); Jiangli Zhu, San Jose, CA (US); Alex Tang, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 122 days.

This patent is subject to a terminal disclaimer.

(21) Appl. No.: 17/954,023

(22) Filed: Sep. 27, 2022

(65) Prior Publication Data

US 2023/0019910 A1 Jan. 19, 2023

Related U.S. Application Data

(63) Continuation of application No. 16/874,389, filed on May 14, 2020, now Pat. No. 11,481,119.

(Continued)

(51) Int. Cl.
*G06F 12/00* (2006.01)
*G06F 3/06* (2006.01)
*G06F 13/00* (2006.01)

(52) U.S. Cl.
CPC .......... *G06F 3/0616* (2013.01); *G06F 3/0647* (2013.01); *G06F 3/0673* (2013.01)

(58) Field of Classification Search
CPC ..... G06F 3/0616; G06F 3/0647; G06F 3/0673

(Continued)

(56) References Cited

U.S. PATENT DOCUMENTS 6,000,006 A * 12/1999 Bruce ................. G06F 12/0246
714/E11.038
6,415,372 B1 * 7/2002 Zakai .................... G06F 3/0629
711/170

(Continued)

FOREIGN PATENT DOCUMENTS

| CN | 105955672 | 9/2016 |
| CN | 108762671 | 11/2018 |
| CN | 112230843 | 1/2021 |

OTHER PUBLICATIONS

"Chinese Application Serial No. 202010679380.1, Office Action mailed Nov. 17, 2023", with English translation, 15 pages.

*Primary Examiner* — Sheng Jen Tsai
(74) *Attorney, Agent, or Firm* — Schwegman Lundberg & Woessner, P.A.

(57) ABSTRACT

Embodiments include methods, systems, devices, instructions, and media for limiting hot-cold swap wear leveling in memory devices. In one embodiment, wear metric values are stored and monitored using multiple wear leveling criteria. The multiple wear leveling criteria include a hot-cold swap wear leveling criteria, which may make use of a write count offset value. Based on a first wear metric value of a first management group and a second wear metric value of a second management group, the first management group and the second management group are selected for a wear leveling swap operation. The wear leveling swap operation is performed with a whole management group read operation of the first management group to read a set of data, and a whole management group write operation to write the set of data to the second management group.

22 Claims, 11 Drawing Sheets

Related U.S. Application Data

(60) Provisional application No. 62/874,357, filed on Jul. 15, 2019.

(58) Field of Classification Search
USPC .......................................................... 711/206
See application file for complete search history.

(56) References Cited

U.S. PATENT DOCUMENTS

| | | | | |
|---|---|---|---|---|
| 6,480,930 | B1* | 11/2002 | Zakai | G06F 3/0629 |
| | | | | 711/170 |
| 6,614,616 | B1* | 9/2003 | Michel | G11B 5/5547 |
| | | | | 360/78.04 |
| 8,565,003 | B2* | 10/2013 | Siau | H10N 70/24 |
| | | | | 365/158 |
| 8,937,292 | B2 | 1/2015 | Bateman | H10N 70/823 |
| | | | | 257/5 |
| 9,519,432 | B1* | 12/2016 | Haustein | G06F 11/1458 |
| 10,210,045 | B1* | 2/2019 | Gao | G06F 11/1666 |
| 10,761,740 | B1* | 9/2020 | Bradshaw | G06F 12/0246 |
| 10,996,863 | B1* | 5/2021 | Kuzmin | G06F 12/0246 |
| 11,481,119 | B2* | 10/2022 | Zhu | G06F 3/0616 |
| 2006/0174063 | A1* | 8/2006 | Soules | G06F 12/0862 |
| | | | | 711/E12.019 |
| 2006/0236073 | A1* | 10/2006 | Soules | G06F 3/067 |
| | | | | 711/216 |
| 2007/0168604 | A1* | 7/2007 | Takai | G06F 3/0629 |
| | | | | 711/113 |
| 2007/0266215 | A1* | 11/2007 | Okada | G06F 3/0616 |
| | | | | 711/165 |
| 2008/0301256 | A1* | 12/2008 | McWilliams | G06F 12/0806 |
| | | | | 714/E11.178 |
| 2009/0089485 | A1* | 4/2009 | Yeh | G06F 12/0246 |
| | | | | 711/159 |
| 2010/0011150 | A1* | 1/2010 | Klein | G06F 12/0246 |
| | | | | 711/E12.008 |
| 2010/0174845 | A1* | 7/2010 | Gorobets | G06F 12/0246 |
| | | | | 711/E12.001 |
| 2010/0228907 | A1* | 9/2010 | Shen | G06F 12/0246 |
| | | | | 365/185.11 |
| 2011/0055458 | A1* | 3/2011 | Kuehne | G06F 12/0246 |
| | | | | 711/E12.001 |
| 2012/0284587 | A1* | 11/2012 | Yu | G06F 12/0868 |
| | | | | 711/E12.008 |
| 2012/0287710 | A1* | 11/2012 | Shirakawa | G11C 16/0483 |
| | | | | 365/185.18 |
| 2014/0029341 | A1* | 1/2014 | In | G11C 11/5628 |
| | | | | 365/185.12 |
| 2014/0244946 | A1* | 8/2014 | Khoueir | G06F 12/0238 |
| | | | | 711/154 |
| 2015/0067239 | A1* | 3/2015 | Chu | G06F 12/0246 |
| | | | | 711/103 |
| 2015/0106556 | A1* | 4/2015 | Yu | G06F 12/0246 |
| | | | | 711/103 |
| 2015/0347038 | A1* | 12/2015 | Monteleone | G06F 3/0653 |
| | | | | 711/103 |
| 2016/0267014 | A1* | 9/2016 | Doi | G11C 13/0069 |
| 2017/0109094 | A1* | 4/2017 | Peng | G06F 3/0638 |
| 2017/0220623 | A1* | 8/2017 | Blount | G06F 16/22 |
| 2017/0269996 | A1* | 9/2017 | Shono | G11C 29/52 |
| 2017/0286293 | A1* | 10/2017 | Gayman | G06F 12/0646 |
| 2017/0300423 | A1* | 10/2017 | Kamruzzaman | G11C 16/3495 |
| 2017/0315879 | A1* | 11/2017 | Park | G06F 11/1469 |
| 2017/0315891 | A1* | 11/2017 | Park | G11C 29/88 |
| 2018/0165011 | A1* | 6/2018 | Kitsunai | G06F 3/0604 |
| 2018/0275894 | A1* | 9/2018 | Yoshino | G06F 3/0689 |
| 2019/0095116 | A1* | 3/2019 | Igahara | G06F 3/0604 |
| 2019/0205040 | A1* | 7/2019 | Gao | G06F 3/0679 |
| 2019/0205245 | A1* | 7/2019 | Gao | G11C 16/16 |
| 2019/0214078 | A1 | 7/2019 | Kim et al. | |
| 2020/0042200 | A1* | 2/2020 | Kanno | G06F 3/0688 |
| 2020/0042225 | A1* | 2/2020 | Oh | G06F 3/061 |
| 2020/0081829 | A1* | 3/2020 | Bradshaw | G06F 3/0616 |
| 2020/0089424 | A1* | 3/2020 | Klein | G11C 29/74 |
| 2020/0110544 | A1* | 4/2020 | Zhu | G06F 3/0679 |
| 2020/0183624 | A1* | 6/2020 | Enz | G06F 3/0659 |
| 2020/0201774 | A1* | 6/2020 | Park | G06F 9/3814 |
| 2020/0341655 | A1* | 10/2020 | Hashimoto | G06F 3/0625 |
| 2021/0019058 | A1* | 1/2021 | Zhu | G06F 12/0246 |
| 2021/0019181 | A1* | 1/2021 | Zhu | G06F 11/3037 |
| 2021/0064248 | A1* | 3/2021 | Zhu | G06F 3/064 |
| 2021/0089218 | A1* | 3/2021 | Zhu | G06F 3/0652 |

* cited by examiner

| SMU DATA TABLE 400 | | | |
|---|---|---|---|
| SMU BASE POINTERS 410 | SMU WRITE COUNT 420 | SMU FWC 430 | SMU MAPPED/ UNMAPPED 440 |
| SMU BASE POINTERS | SMU WRITE COUNT | SMU FWC | SMU MAPPED/ UNMAPPED |
| SMU BASE POINTERS | SMU WRITE COUNT | SMU FWC | SMU MAPPED/ UNMAPPED |
| ... | ... | ... | ... |
| SMU BASE POINTERS | SMU WRITE COUNT | SMU FWC | SMU MAPPED/ UNMAPPED |

*FIG. 4*

LIMITING HOT-COLD SWAP WEAR LEVELING

PRIORITY CLAIM

This application is a continuation of U.S. application Ser. No. 16/874,389, filed May 14, 2020, which claims priority to U.S. Provisional Patent Application Ser. No. 62/874,357, filed Jul. 15, 2019, all of which are incorporated herein by reference in their entirety.

TECHNICAL FIELD

Embodiments of the disclosure relate generally to memory sub-systems, and more specifically, to optimizing hot-cold swap wear leveling operations in a memory sub-system.

BACKGROUND

The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 illustrates aspects of an example memory sub-system in accordance with some embodiments of the present disclosure.

DETAILED DESCRIPTION

Figure 1:
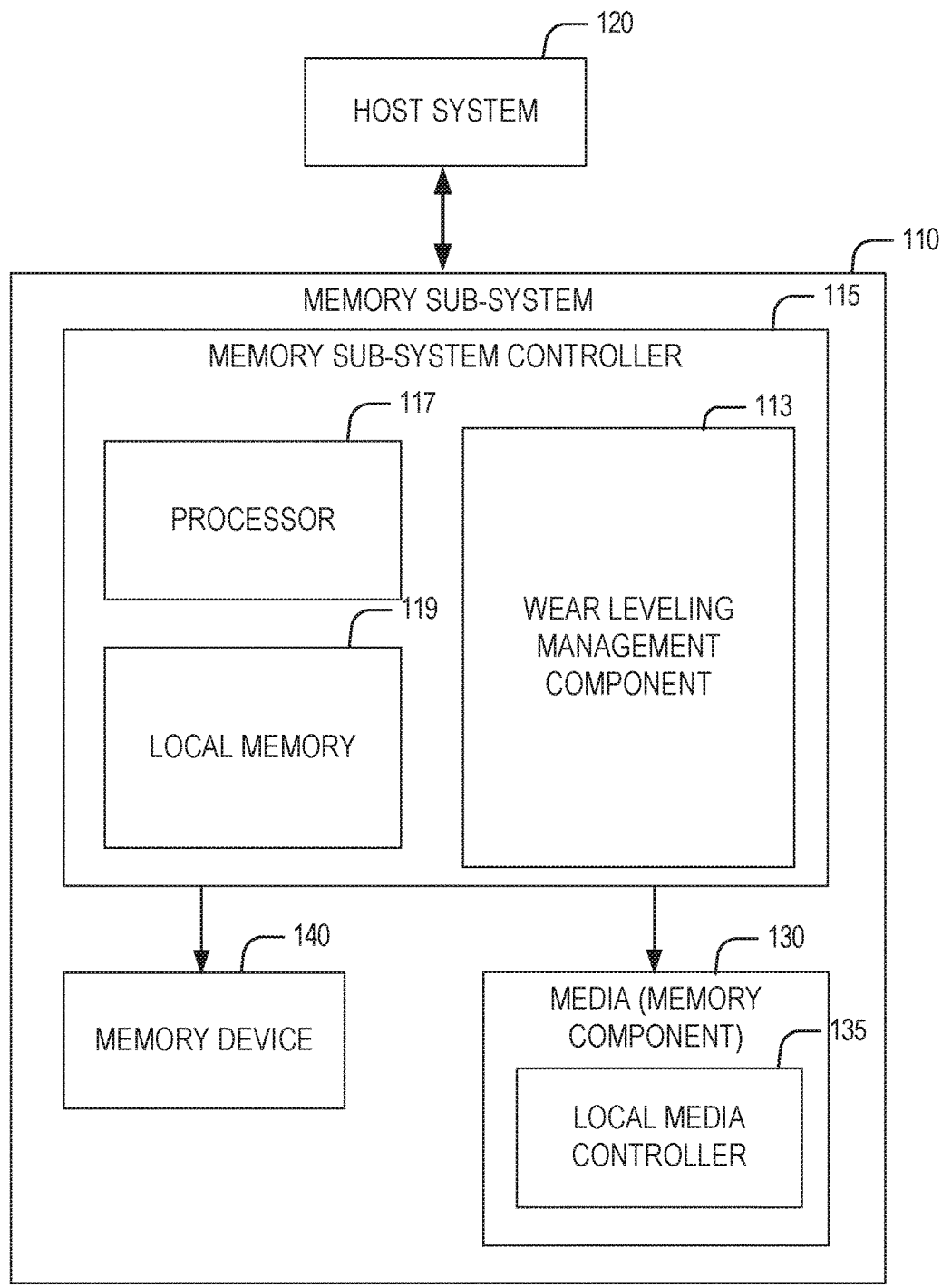
FIG. 1 illustrates an example computing environment that includes a memory sub-system in accordance with some embodiments of the present disclosure.

Aspects of the present disclosure are directed to optimizing hot-cold swap operations in wear leveling in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1. Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

The host system can send access requests to the memory sub-system, such as to store data at the memory sub-system and to read data from the memory sub-system. The data to be read and written are hereinafter referred to as "user data." A host request can include a logical address (e.g., logical block address (LBA)) for the user data, which is the location the host system associates with the user data. The logical address can be part of metadata for the user data.

The memory devices can include non-volatile and volatile memory devices. A non-volatile memory device is a package of one or more dice. The dice in the packages can be assigned to one or more channels for communicating with a memory sub-system controller. The non-volatile memory devices include cells (i.e., electronic circuits that store information), that are grouped into pages to store bits of data.

The non-volatile memory devices can include, for example, three-dimensional cross-point ("3D cross-point") memory devices that are a cross-point array of non-volatile memory that can perform bit storage based on a change of bulk resistance, in conjunction with a stackable cross-gridded data access array.

Such non-volatile memory devices can group pages across dice and channels to form management units (MUs). An MU can include user data and corresponding metadata. A memory sub-system controller can send MUs to and from memory devices. A super management unit (SMU) is a group of one or more MUs that are managed together. For example, a memory sub-system controller can perform media management operations (e.g., wear level operations, refresh operations, etc.) on SMUs.

A memory sub-system can perform internal management operations, such as media management operations (e.g., defect scanning, wear leveling, refresh), on the non-volatile memory devices to manage the memory devices. The storing of data at a memory device can increase the wear of the memory device. After a threshold amount of write operations, the wear can cause the memory device to become unreliable so that data can no longer be reliably stored and retrieved from the memory device. At such a point, the memory sub-system can result in a failure when any of the memory devices fails.

One technique for managing the endurance in memory sub-systems with physical components having limited use cycles (e.g. a limited number of write and/or read cycles before expected failure) is wear leveling. Wear leveling is a process that helps reduce premature wear in memory devices by distributing write operations across the memory devices. Wear leveling includes a set of operations to determine which physical media (e.g., set of memory cells) to use each time data is programmed to help ensure that certain physical sets of memory cells are not written and erased more often than others. A wear leveling operation can attempt to evenly distribute the wear operations (e.g., write operations, read operations, erase operations, or any suitable combination thereof), and thus the corresponding physical wear, across data groupings (e.g., pages, management units, or other data groupings) of the memory devices, thus limiting the probability of certain portions of the memory sub-system failing before others.

Swap operations, where data is moved from one location in memory, can be part of wear leveling operations in such systems. Such operations can include hot-cold swaps, which swap data between "cold" memory with low use counts (e.g., read/write/erase use counts), and "hot" memory with high use counts. Such operations, however, can be expensive in terms of system resources. In cross-point systems, such swaps can involve a read of a large group of management units followed by a write of the entire group of management units. Additionally, such operations increase a "write amplification" value of a memory sub-system, where a higher value reflects negative conditions where fewer device operations are used for the primary function of the memory sub-system (e.g., providing host services), and more operations are used for internal memory sub-system management.

Aspects of the present disclosure address the above and other deficiencies by including an offset value in the trigger conditions for hot-cold swap operations. The memory cells of the memory devices can be organized into some number of individual units, such as pages, MUs, SMUs, or blocks of the memory component, each of which experiences physical wear. These units can represent an individual segment of the memory component that can be written or erased in a single operation.

The offset value can be customized to limit the number of hot-cold swap operations performed by a memory sub-system, while managing disadvantages of such reduced operations, such as increases in use count differences between MUs (e.g., the difference in use count between the MU with the highest use count and the MU with the lowest use count). In some embodiments, the offset value can be tuned to target specific write amplification and variations in SMU writes within a memory sub-system. Embodiments improve the operation of memory sub-systems by reducing the write amplification during memory sub-system use, including significant write amplification reduction under average workloads, such as a sequential workload. This improves device performance by increasing memory sub-system throughput and reducing latency.

FIG. 1 illustrates an example computing system 100 that includes a memory sub-system 110 in accordance with some embodiments of the present disclosure. The memory sub-system 110 can include media, such as one or more volatile memory devices (e.g., the memory device 140), one or more non-volatile memory devices (e.g., the memory device 130), or a combination of such.

The memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access the memory devices (e.g., the memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), or any suitable combination thereof), or other suitable processor.

The memory sub-system controller 115 can include a processing device 117 (e.g., a processor) configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translastions between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or the memory device 140 and convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a wear leveling management component 113 that can optimize hot-cold swap wear leveling operations in the memory sub-system 110. The wear leveling management component 113 can use an offset value in a trigger condition for initiating hot-cold swap wear leveling operations to minimize the hot-cold swap wear leveling operations. In some embodiments, the memory sub-system controller 115 includes at least a portion of the wear leveling management component 113. For example, the memory sub-system controller 115 can include the processing device 117 configured to execute instructions stored in local memory 119 for performing the operations described herein. In some embodiments, the wear leveling management component 113 is part of the host system 110, an application, or an operating system. Further details with regards to the operations of the wear leveling management component 113 are described below.

Figure 2:
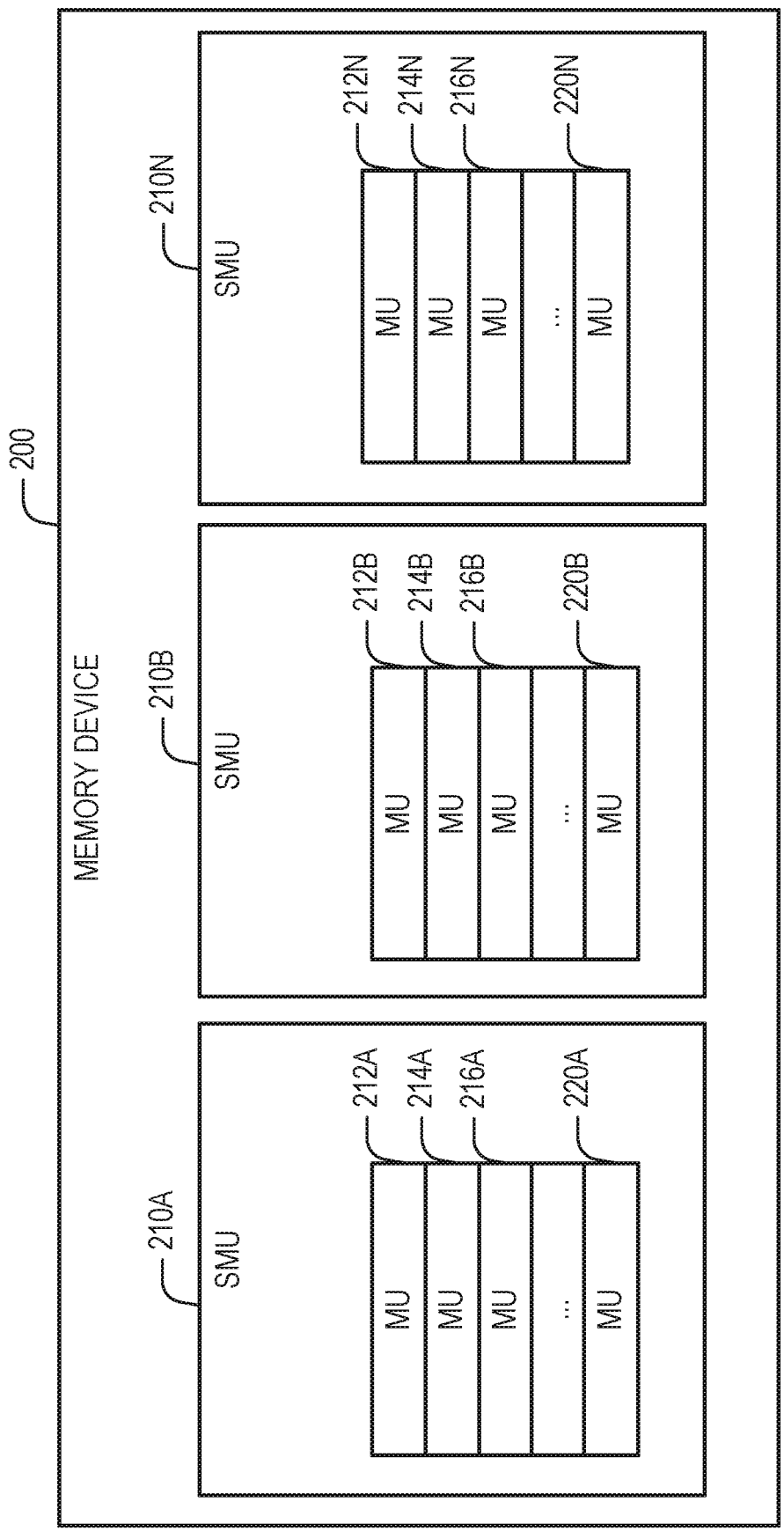
FIG. 2 illustrates aspects of an example memory sub-system in accordance with some embodiments of the present disclosure.

FIG. 2 illustrates aspects of an example memory structure of a memory sub-system in accordance with some embodiments of the present disclosure. As described herein, memory devices 130 can be configured with MU and SMU structures as illustrated by memory structure 200. In some embodiments, memory structure 200 is particularly cross-point memory as described above, with as a set of SMUs 210A through 210N.

In some embodiments, MUs can be groups of dies, channels, pages, codewords, parity bits, memory cells, or a combination thereof. The MUs can enable a memory sub-system controller to manage (e.g., perform operations, procedures, and the like) on portions of the memory devices in allocated groups or sections of the media.

In some embodiments, memory structure 200 is particularly cross-point memory as described above, with as a set of SMUs 210A through 210N. Each SMU includes a corresponding set of MUs 212 through 220. For example, as shown, SMU 210A includes MUs 212A through 220A, and SMU 210N includes MUs 212N through 220N. In one example embodiment, a memory structure 200 system can have 100,000 SMUs, with each SMU containing 1000 MUs. Other embodiments of such coarse mapped storage 200 can have different numbers of SMUs and MUs, with the balance of SMUs and MUs configured for efficient management of data storage. The memory cells of the memory devices can be organized into some number of individual units. For example, 3D cross-point memory devices can organize pages into MUs, and MU can be grouped into SMUs. In another example, NAND memory devices a group of pages forms a block. Individual units can represent individual segments of a memory device that can be written or erased in a single operation. MUs and SMUs are used as examples of a unit hereinafter.

In a memory sub-system, portions (e.g., SMUs) with available space can be mapped to data (e.g., user data and metadata) and some portions (e.g., SMUs) may be unmapped to data. Mapped portions (e.g., SMUs) hereinafter refers to portions (SMUs) that are storing data or available to store data. Unmapped portions of memory (e.g., unmapped SMUs) hereinafter refers to portions of the memory device that are not storing data or not available to store data. The mapped SMUs can be organized into a set or pool of mapped SMUs and the unmapped SMUs can be organized into a set or pool of unmapped SMUs.

Figure 3:
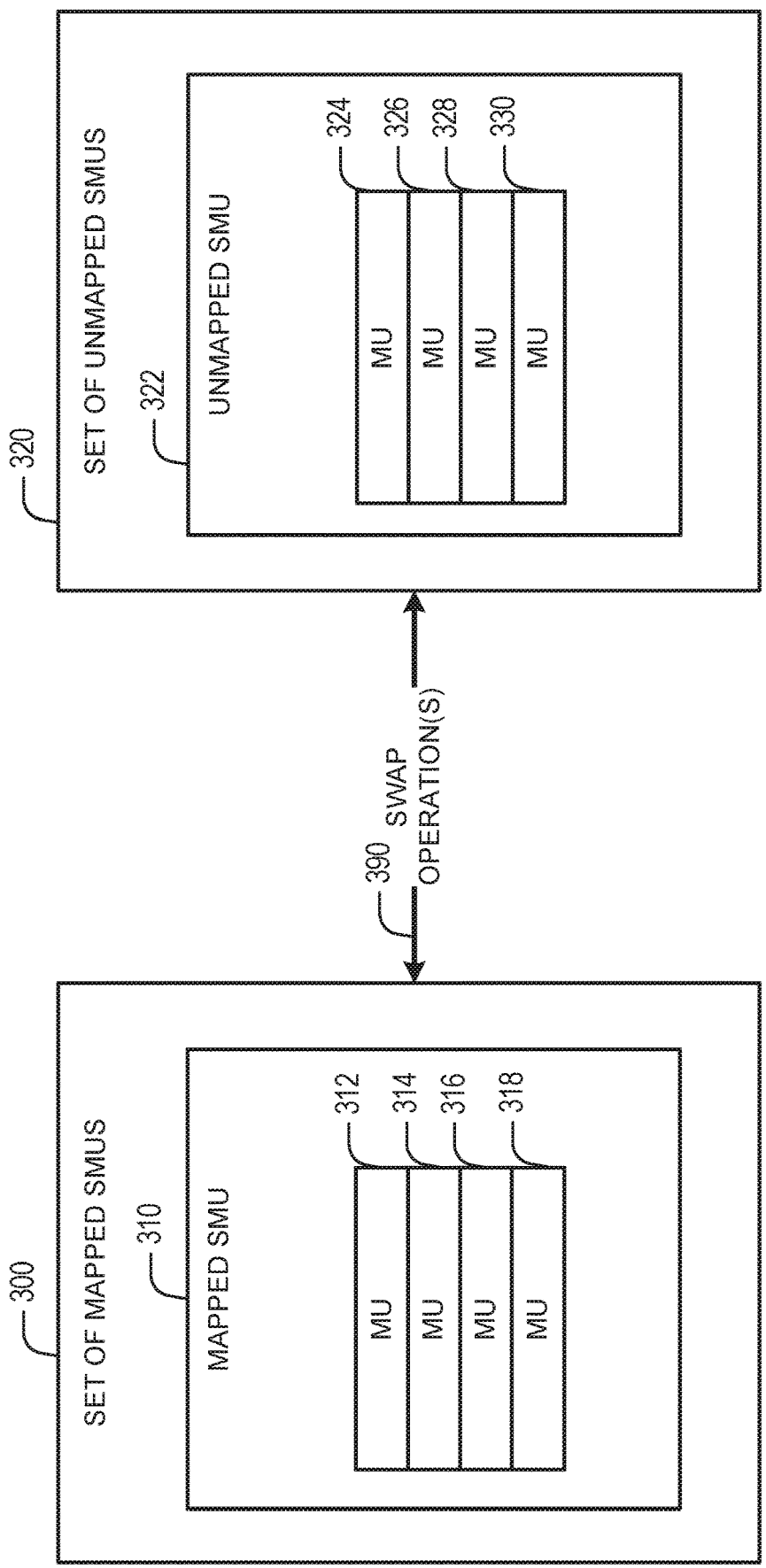
FIG. 3 illustrates aspects of an example memory sub-system in accordance with some embodiments of the present disclosure.

FIG. 3 illustrates SMU wear leveling (e.g., inter-SMU wear leveling) using a set of mapped SMUs 300 and a set of unmapped SMUs 320, in accordance with some embodiments of the present disclosure. When an SMU includes MUs that are mapped (e.g., programmed with data or available to be programmed with data) to data, the SMU can be referred to as a mapped SMU. When an SMU includes MUs that are not mapped to data or are empty, the SMU can be referred to as an unmapped SMU.

FIG. 3 illustrates an example of a mapped SMU 310 and an unmapped SMU 322. Mapped SMU 310 includes a number of mapped MUs 312, 314, 316, and 318. Unmapped SMU 322 also includes a number of unmapped MUs 324, 326, 328, and 330. The mapped SMU 310 can be included in the set of mapped SMUs 300 and the unmapped SMU 322 can be included in the set of unmapped SMUs 320. Only a limited number of mapped SMUs and unmapped SMUs are depicted in the set of mapped SMUs and the set of unmapped SMUs, respectively, but in practice any number of mapped SMUs and unmapped SMUs can be included in the set of mapped SMUs and the set of unmapped SMUs. Further, each of the mapped SMUs and the unmapped SMUs can include any number of data management units.

In one embodiment, wear leveling management component 113 can perform inter-SMU wear leveling by with swap operation(s) 390 for swapping the mapped SMU 310 with the unmapped SMU 322. For example, when a threshold condition is satisfied, such as the sub-total write counter associated with the mapped SMU 310 exceeding a threshold value, the data of the mapped SMU 310 can be copied to the set of unmapped SMUs 320 and the unmapped SMU 322 can be included in the set of mapped SMUs 300. The inter-SMU wear leveling of swap operations 390 can use indirect fully associative mapping implemented by a mapping data structure to store the mappings of logical addresses to the physical addresses of the SMUs as the SMUs are swapped between the set of mapped SMUs 300 and the set of unmapped SMUs 320. As described in more detail below, swap operations 390 can include a read of a whole SMU (e.g., all MUs of an SMU) followed by a write of the whole SMU.

Various systems can use different wear metrics. Total write counts (e.g., the number of times a write operation that writes data to a data unit is performed on the data unit during the lifetime of the data unit), total read counts (e.g., the number of times a read operation that reads data from a data unit is performed on the data unit during the lifetime of the data unit), or total erase counts (e.g., the number of times an erase operation that erases data from a data unit is performed on the data unit during the lifetime of the data unit) can be indicators of wear on the data units of memory devices. Other metrics can also be used, as described herein.

In various implementations, a wear leveling operation can rewrite data of a data unit having a high wear metric to another data unit having a lower wear metric, or vice versa (e.g., rewrite data of a data unit having a low wear metric to another data unit having a higher wear metric). In such implementations, a wear metric can be indicative of a level of physical wear on a data unit. Some examples of wear metrics can include write count, read count, or a combination of write count and read count. Although the discussion herein focuses mainly on write counts, it should be noted that additional types of counts can be implemented using similar techniques.

In some implementations, a wear metric can include a combination of a write count and a read count. For example, the wear metric can include both the write count and the read count for a particular data unit where the write count and read count are combined using one or more equations. The physical wear on a data unit caused by a read operation can be less than the physical wear caused by a write operation. To combine the read count and write count for a data unit, the read count or write count for a data unit can be normalized (e.g., adjusting counts measured by different scales to a common scale) by weighting the write count or the read count. For instance, a read count for a data unit can be multiplied by a fraction (e.g., 0.8) to determine the equivalent number of write counts that the read counts represent in terms of wear. The weighted read count and the write count for the data unit can be combined (e.g., added) and be used as a wear metric indicative of the physical wear on the particular data unit.

In some implementations, memory devices 112 can include non-volatile memory devices, such a non-volatile memory devices that include a cross-point array of non-volatile memory cells. As noted above, a cross-point array of non-volatile memory can perform bit storage based on a change of bulk resistance, in conjunction with a stackable cross-gridded data access array. Additionally, in contrast to many flash-based memories that perform write out-of-place operations (e.g., data at location that is to be written is erased before other data can be programmed to the location), cross-point non-volatile memory can perform a write in-place operation, where a non-volatile memory cell can be programmed without the non-volatile memory cell being previously erased. It can be noted that the wear metrics for cross-point non-volatile memory cannot include an erase count due to the ability of the cross-point non-volatile memory to perform write in-place operations. An erase count can be used to determine wear metrics for other types of memory devices. The erase count can be a value indicating the number of times a memory operation, such as an erase operation that erases data of a data unit, is performed on the data unit during the lifetime of the data unit. Aspects of the disclosure can be applied to other types of non-volatile memory devices or other types of memory devices.

Various conditions can be used to determine when to swap an SMU in the mapped SMU with an SMUs in the unmapped SMUs by copying data from the SMU in the mapped SMU to the SMU in the unmapped SMU. In some memory sub-systems, the conditions rely on a total write counter for the SMUs (e.g., a historical write count for the SMU over a lifetime of the SMU). Using the total write counters for the SMUs to move SMUs between the set of mapped SMUs and the set of unmapped SMUs can lead to write amplification. Write amplification can refer to increasing the frequency of performing write operations. For example, a first condition (e.g., a lowest write count condition or "cold" swap condition) can specify swapping a first SMU in the set of mapped SMUs with a second SMU in the set of unmapped SMUs when the first SMU becomes "cold." Becoming "cold" can refer to the first SMU having a minimum total write counter relative to other SMUs in the set of mapped SMU and its minimum total write counter being lower than a total write counter of the second SMU, which is a minimum relative to the other SMUs in the set of unmapped SMU.

However, copying data to a large number of data blocks included in the second SMU to include the second SMU in the set of mapped SMUs can cause a number of writes commensurate to the large number of data blocks. Accordingly, a write count of the SMU being added to the set of mapped SMUs can increase to a value where a second condition (e.g., a highest write count condition or "hot" swap condition) is satisfied. Without a mechanism to detect whether the second SMU was recently written to (e.g., is "hot"), the second SMU can be selected to copy its data to another SMU in the set of unmapped SMUs and wear leveling is not achieved. Additionally, write amplification can become unbounded.

Further, another goal of wear leveling can be to attempt to converge the difference between the total write counters of the SMUs, where each total write counter of a SMU is a sum of the total write counters of the respective MUs included in that SMU, and/or to converge the difference between the total write counters of the individual data blocks within each of the SMU. In some memory sub-systems that rely on just the total write counter for conditions, as described above, the write amplification can cause certain total write counters of SMUs to diverge from the rest of the total write counters of the other SMUs. Thus, some SMUs with higher total write counters can degrade faster than others. Also, unbounded write amplification can result in degradation of the performance of the memory sub-system as more writes are being performed and latency is experienced by a host system connected to the memory sub-system as the bandwidth drops while the writes are being performed. Since wear leveling is not achieved, the life of the memory devices as a whole is reduced.

Wear leveling can be performed at varying levels within the data structures using different wear leveling techniques. Some systems operate with wear leveling at a single level. In some embodiments using the SMU and MU memory structures described above, wear leveling is performed at the SMU level. This inter-SMU wear leveling can use indirect fully associative mapping implemented by a mapping data structure (e.g., a look-up table) based on triggers for wear leveling. In some embodiments, for example, one trigger occurs after at least a sub-total write counter or fresh write counter associated with a mapped SMU exceeds a threshold value. In such embodiments, the sub-total write counter can include a value that indicates a number of write operations performed on the mapped SMU after the SMU became mapped to data (e.g., data was copied from another SMU to the mapped SMU).

FIG. 4 illustrates aspects of an example memory sub-system in accordance with some embodiments of the present disclosure. FIG. 4 shows an SMU data table 400 that includes one or more wear level metrics. The wear leveling metrics include, for each SMU, an SMU base pointer 410, an SMU write count 420, and an SMU forward write count (FWC) 430. The SMU data table 400 also indicates, in the SMU mapped/unmapped column 440, whether the SMU is mapped or unmapped. In other example embodiments, different data structures are used to track the SMU data. For example, a linked list or other data structure may be used in place of the SMU data table 400. The data structure can be stored in a memory device (e.g., memory device 140, memory device 130), or on local memory of the memory sub-system controller.

The SMU data table 400 includes table entries for each SMU in memory device 130. The table entries for each SMU includes one or more wear leveling metrics. The metrics can include, for example, and are not limited to, total write counts (e.g., the number of times a write operation that writes user data to an SMU MU is performed on the respective SMU during the lifetime of the respective SMU), total read counts (e.g., the number of times a read operation that reads user data from an SMU is performed on the respective SMU during the lifetime of the respective SMU), or total erase counts (e.g., the number of times an erase operation that erases data from an SMU is performed on the respective SMU during the lifetime of the respective SMU), or any suitable combination thereof. In some embodiment, the metrics can include MU metrics.

In some embodiments, the SMU data table 400 include entries to match the number of SMUs in the memory sub-system. During operation, the values in the entries (e.g., each entry) of SMU data table are updated. For example, if an SMU "C" is a target of a write operation, the SMU write count and SMU FWC for the SMU "C" can be incremented. If the write operation is also part of a move or swap operation, the SMU base pointer for the SMU "C" can be adjusted as well. SMU data table 400 can be accessed, used, and/or maintained by a wear leveling management component 113. In other embodiments, the SMU data table 400 can be an independent data table operating as part of memory sub-system 110 and accessed by wear leveling management component 113.

The data used by a system for wear leveling operations in SMU data table 400 includes base pointer data, write count data, and FWC data. During wear leveling operations, a new address for the base pointer of the particular target SMU (e.g., an SMU base pointer 410 for an SMU "B") can be determined within the SMU using at least one of a set of address determining techniques including a deterministic function, a mapping function, a randomization function, a look-up table, or a bit map. The new address of the base pointer and an index of the address determining technique in the set of address determining techniques can be stored for the SMU. Any access attempts to a logical address of an MU in the SMU can use the new address of the base pointer and/or the index of the address determining technique to determine a physical address of the requested MU within an SMU.

As described above, inter-SMU wear leveling can include swapping all of MUs of an SMU that is mapped to the MUs of an SMU that is free. The former SMU becomes a free SMU and the latter SMU becomes a mapped SMU. In this way, the SMU in the set of mapped SMUs is included in the set of unmapped SMUs, and the SMU in the set of unmapped SMUs is included in the set of mapped SMUs. In some embodiments, one MU of an SMU can be swapped with another MU in another SMU individually, while in other embodiments, multiple MUs of an SMU can be concurrently swapped with multiple MUs in another SMU.

In some embodiments, in addition to a base pointer, other metadata can be associated with each of the SMUs to enable a difference between total write counters to converge and to bound write amplification.

The total write counter SMU write count 420 can include a value indicating a total historical write count for the SMU over the lifetime of the SMU (e.g., before the SMU is moved to the set of mapped SMUs and since the SMU is moved to the set of mapped SMUs). In some embodiments, an SMU write count 420 in a total write counter of SMU data table 400 can be configured to exceed a value of one million (e.g., more than 21 bits in the possible value). In other embodiments, other limitations or data sizes can be used.

A sub-total write counter or fresh write counter associated with SMU FWC 430 and a total write counter associated with SMU write count 420 can be associated with each SMU. The sub-total (e.g., FWC) write counter can include a value that indicates a number of write operations performed on the respective SMU since data from another SMU is copied to the respective SMU and the respective SMU is included in the set of mapped SMUs. That is, the sub-total write counter can include a value indicating a number of write operations performed on the respective SMU since the respective SMU was swapped from the set of unmapped SMUs to the set of mapped SMUs. A threshold value is used to determine when a hot-cold swap operation is triggered using the FWC, and the FWC is then reset to zero. In other embodiments, the FWC can reflect the lower bits of the total write count, with monitoring to determine when the FWC exceeds the threshold value, and when the FWC cycles. For example, if the FWC represents the lower 15 bits of a 22-bit SMU WC, a wear leveling management component 113 can track when the FWC exceeds a threshold and when the lower 15 bits cycle to all zero values following a hot-cold swap operation.

Any time data is copied from a mapped SMU to an unmapped SMU, the unmapped SMU becomes a mapped SMU and the sub-total write counter for the new mapped SMU is reset. Also, the total write counter for the new mapped SMU is not reset. Further writes to the new mapped SMU in the set of mapped SMUs can cause the sub-total write counter to increment and the total write counter to increment. To ensure that data of the new mapped SMU is not copied to another SMU in the set of unmapped SMUs too quickly after becoming a mapped SMU, the inter-SMU wear leveling operation can be performed on the new mapped SMU when the sub-total write counter exceeds a threshold value as a first threshold wear condition. In this way, the "hotness" of the SMU can be detected and write amplification can be bounded by preventing SMUs that were recently mapped to data from being unmapped to data before desired. The threshold value can be any suitable number and can be tunable.

In some embodiments, the wear leveling operation can be performed based on the subtotal write counter and the total write counter. For example, in addition to satisfying the first threshold wear condition, an additional wear level condition can include comparing the total write counter of the SMU to another SMU having a minimum total write counter relative to the other SMUs in the set of mapped SMUs and the set of unmapped SMUs. A determination can be made as to whether the difference between the values of the total write counters exceeds a threshold value. If the sub-total write counter exceeds a threshold value and the total write counter is larger than a minimum total write counter of another SMU by a threshold value, then the inter-SMU wear leveling operation can be performed to copy data from the SMU in the set of mapped SMUs to another SMU in the set of unmapped SMUs.

Figure 5:
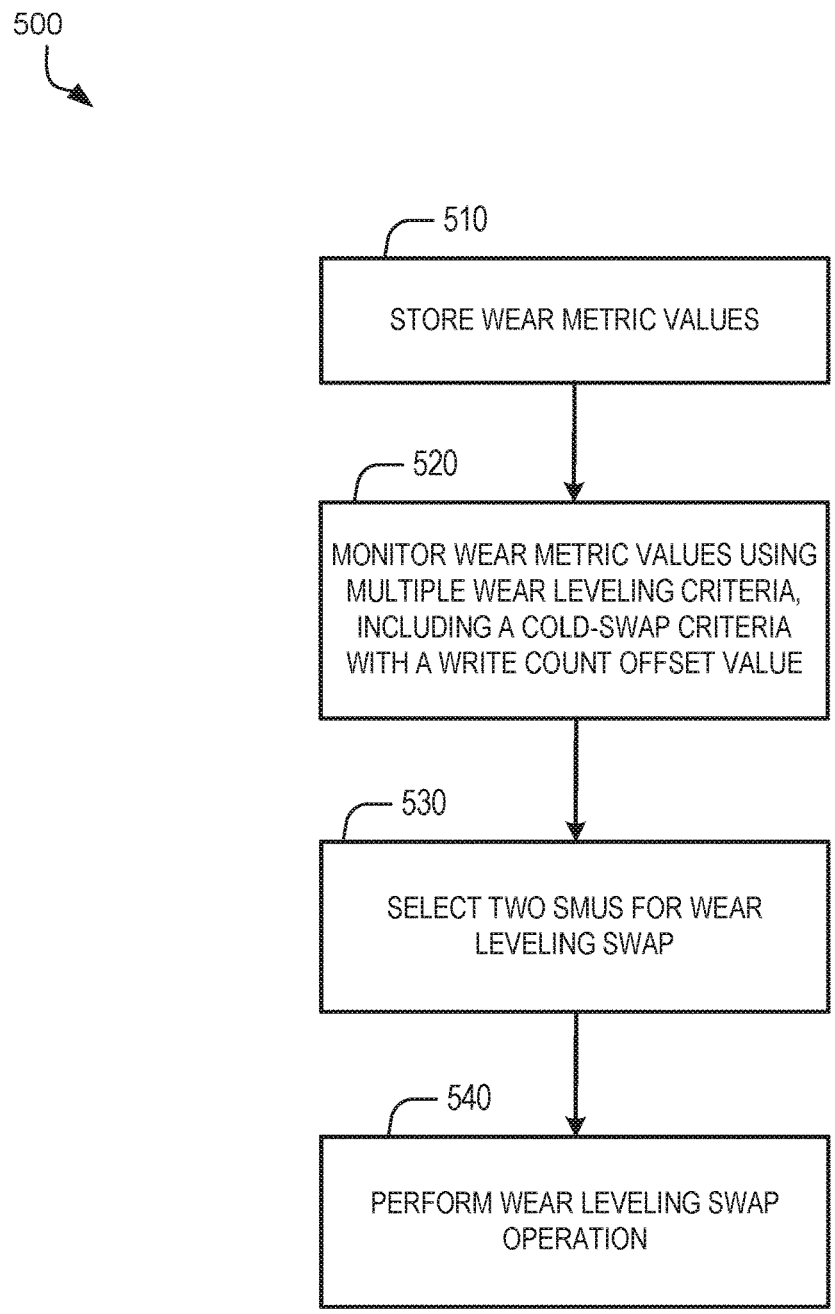
FIG. 5 is a flow diagram of an example method in accordance with some embodiments of the present disclosure.

FIG. 5 is a flow diagram of an example method 500 to perform wear leveling operations in memory devices while limiting hot-cold swaps, in accordance with embodiments of the present disclosure. The method 500 can be performed by processing logic that can include hardware (e.g., processing device, circuitry, dedicated logic, programmable logic, microcode, hardware of a device, integrated circuit, or any suitable combination thereof), software (e.g., instructions run or executed on a processing device), or a combination thereof. In some embodiments, the method 500 is performed by the wear leveling management component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In operation 510, the wear leveling management component 113 stores wear metric values for each management group of the of management groups of memory devices in a memory sub-system (e.g. memory sub-system 110). As described above in the structure of memory component 220, each management group (e.g. SMU) is made up of MUs, and each MU a plurality of memory elements (e.g. individually addressable memory bits in a 3D cross-point memory system). For example, 3D cross-point memory devices can organize pages across dice and channels to form management units (MUs), and MU can be grouped into SMUs.

At operation 520, the processing device monitors wear metric values (e.g., SMU write counts 420 or SMU FWC 430). This monitoring is performed with one or more wear leveling criteria. In some embodiments, more than two wear leveling criteria can be used. In some embodiments, one of the wear leveling criteria is a hot-cold swap criteria which includes a write count offset value. The write count offset value can be tunable for particular deployments of a memory sub-system, and in some systems can be used to almost completely eliminate hot-cold swap operations. Additional details related to the offset are described below.

At operation 530, the processing device selects multiple management groups (e.g. SMUs) for a wear leveling swap. In some embodiments, the processing device selects two SMUs. This selection can be based on wear metric values for respective management groups. For example, the selection can be based on a first wear metric value of a first management group and a second wear metric value of a second management group. Depending on the criteria used for the selection, the SMUs can be specifically determined by the criteria, so that the different management groups for a wear leveling swap operation are specifically identified by the monitoring criteria. For example, a hot-cold swap criteria can be triggered when a write count offset plus a lowest write count value of the write count values for a set of mapped management groups is lower than a lowest write count value of the write count values for a set of unmapped management groups. Such a criteria identifies a specific SMU from mapped SMUs (e.g. the set of mapped SMUs 300) and a specific SMU from unmapped SMUs. (e.g. the set of unmapped SMUs 320.)

Other criteria only identify a single target SMU, and the second SMU for the swap can be random or based on another independent criteria. For example, as described above for hot-cold swap operations, the criteria can compare a fresh write count value against a threshold value for each SMU in a system. When a particular target SMU (e.g. a mapped SMU 310) has a fresh write count that exceeds the threshold, a wear leveling swap is triggered. This criterion, however, only identifies the specific single SMU with the corresponding fresh write count that has just exceeded the threshold value. The second SMU (e.g., an unmapped SMU 322) can be selected randomly, or based on another wear leveling criteria. For example, the second SMU can be selected as the unmapped SMU of the set of unmapped SMUs with the lowest total write count. In other embodiments, additional more complex criteria can be used. For example, if the first SMU has a history of infrequent use, a second SMU can be selected based on criteria to use an SMU with a total high write count. Similarly, if the first SMU has a history of frequent use, a second SMU can be selected based on a low total write count. In other embodiments, any such additional criteria can be used.

At operation 540, the processing device performs the wear leveling swap operation. As described above, such a swap operation involves a read of a whole management group (e.g., a DMU or MU) of the management group, as well as a whole management group write operation (e.g. a write of each MU of the management group) to write the set of data to the second management group.

Figure 6:
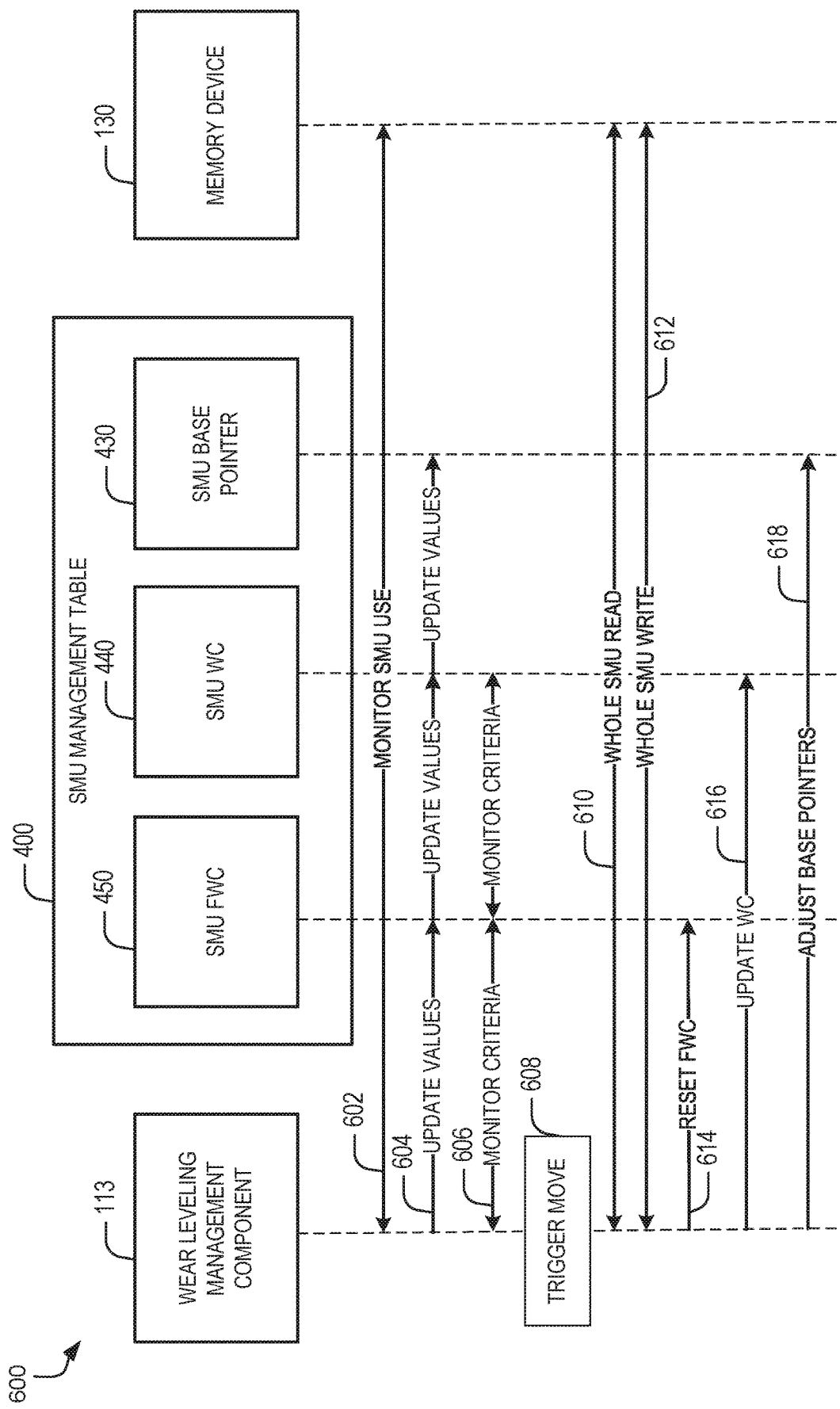
FIG. 6 is a communication chart illustrating aspects of systems in accordance with some embodiments of the present disclosure.

FIG. 6 is a communication chart illustrating aspects of systems in accordance with some embodiments of the present disclosure. The system 600 of FIG. 6 includes wear leveling management component 113, SMU management table 400, and memory device 130. SMU management table includes SMU FWC 430, SMU WC 420, and SMU base pointer 410 elements, as described above in detail for FIG. 4. While system 600 illustrates a particular implementation, in other implementations, additional memory devices or media can be present, additional data, metrics, counters, or other information can be present in SMU 400, and the wear leveling management component 113 and SMU management table 400 can be integrated together or kept separate In illustrated operation 602, the wear leveling management component 113 interacts with data from memory device 130 to monitor SMU use. This can include monitoring reads, writes, moves, or any front-end host service operations (e.g. reads and writes initiated by a host device) as well as back-end internal management operations (e.g. data refresh move operations, etc.) As memory operations occur, the metrics for the SMUs involved in the operations are updated in operations 604.

In operations 606, the various criteria (e.g., hot-cold swap criteria) are monitored by wear leveling management component 1130 using the data from SMU management table 400. As described above, at least one of the criteria is a hot-cold swap criterion with a write count offset. When criteria for a swap are met in accordance with one of the monitored criteria, a move operation is initiated by wear leveling management component 113 in operation 608. A whole SMU read operation 610 and a whole SMU write operation 612 then occur in response to the move trigger of operation 608.

As part of monitoring of operations involving memory device 130, the FWC of SMU FWC 430 for the target SMU is reset in operation 614. In some embodiments, a system can operate with a different mechanism for reset or rollover of the SMU FWC 430 value. The total write count of SMU WC 420 is then updated in operation 616. Depending on the particular embodiment, the base pointer of SMU base pointer 410 can also be updated in various ways. Some embodiments particularly randomize the SMU base pointer 410 value during move operations to improve wear leveling performance.

Figure 7:
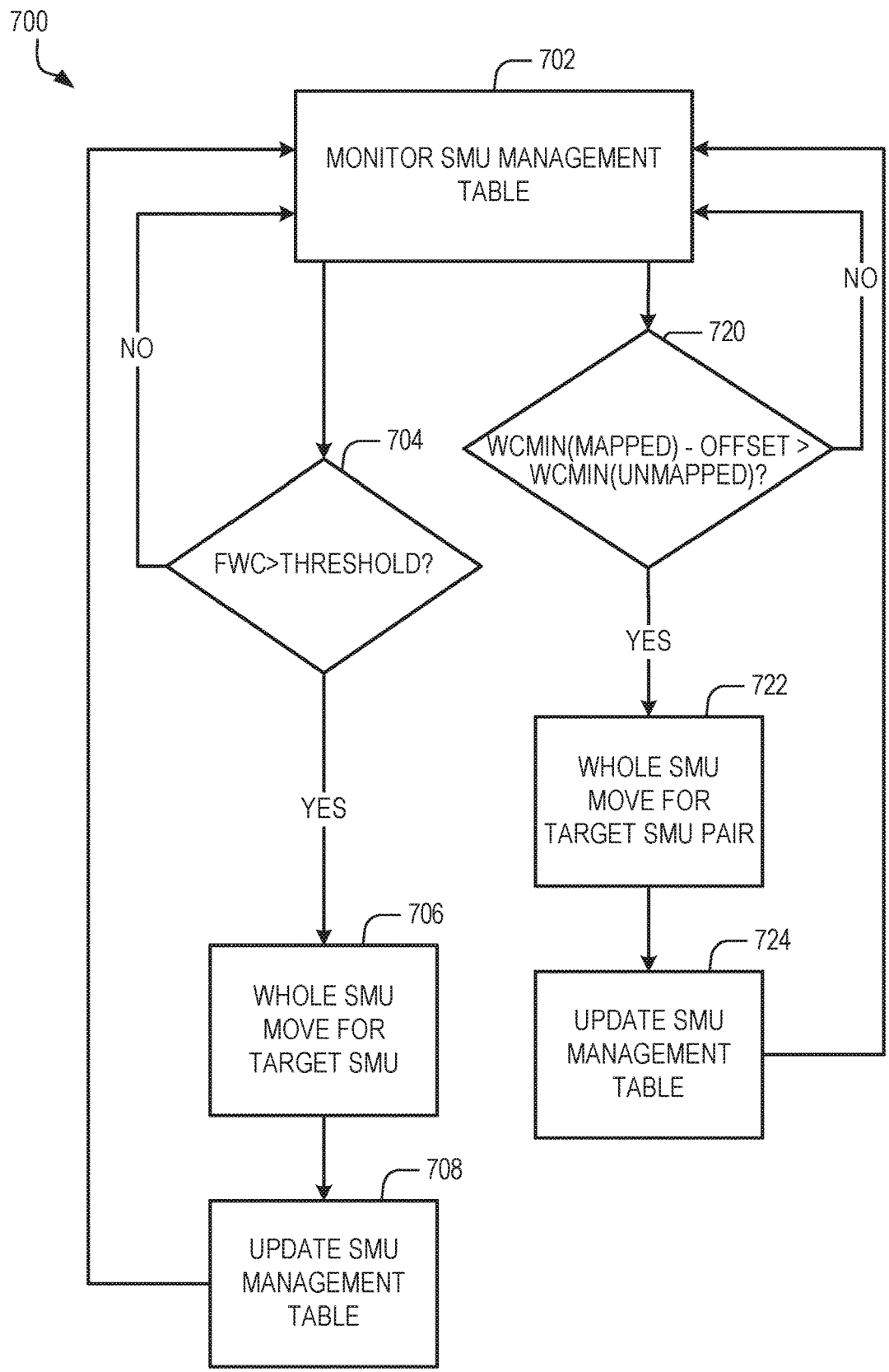
FIG. 7 is a flow diagram of an example method in accordance with some embodiments of the present disclosure.

FIG. 7 is a flow diagram of an example method in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the wear leveling management component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In method 700, the processing device (e.g. executing instructions for wear leveling management component 113) monitors an SMU management table. The data in the table is updated as various host operations make use of memory device(s) associated with the SMU management table. The monitoring initiates checks of multiple wear leveling criteria.

A first wear leveling criterion of operation 704 is a hot-cold swap wear leveling criterion. In operation 704, the hot-cold swap wear leveling criterion is:

$$FWC > \text{Threshold}_{SMU} \quad (1)$$

In the comparison above, FWC is the fresh write count value and ThresholdSMU is a threshold value for triggering a hot-cold swap operation for a target management group having a corresponding fresh write count greater than the threshold value. If the metadata for particular SMUs does not meet this criterion, then the method 700 continues monitoring. If the criterion is met, then in operation 706, a whole SMU move (e.g., a whole SMU read of the mapped SMU and a whole SMU write to the unmapped SMU) is performed to move the data in the target SMU that met the criteria to an unmapped SMU. The SMU management table is then updated in operation 708, and the method proceeds.

A second wear leveling criteria of operation 720 is a hot-cold swap wear leveling criteria with a write count offset. In operation 720, the hot-cold swap wear leveling criteria is determined according to:

$$WC_{min}(\text{mapped}) - \text{Offset} > WC_{min}(\text{unmapped}) \quad (2)$$

In this second hot-cold swap criterion, WCmin(mapped) is the lowest write count value of the write count values for a set of mapped management groups, WCmin(unmapped) is the lowest write count value of the write count values for a set of unmapped management groups. second management group, and Offset is the offset value. Because of the use of an Offset value, a mapped SMU is not immediately swapped with an unmapped SMU when the write count value of the (least used) mapped SMU exceeds the write count value of the (least used) unmapped SMU. Without the Offset, data could be repeatedly swapped between two SMUs after each modification, resulting in 100% overhead. By using the Offset, a minimum number of modifications are guaranteed to be made to the data before incurring the cost of another swap operation.

If the criterion is not met in operation 720, the method 700 continue with monitoring the management table periodically or using any suitable monitoring mechanism. If the criterion is met, then in operation 722, a whole SMU move (e.g., a whole SMU read and a whole SMU write) is performed to move the data in the target SMU that met the criteria to an unmapped SMU. The SMU management table is then updated in operation 724, and the method proceeds with a steady state monitoring until the next time one of the criteria is met based on metadata in the SMU management table.

Figure 8:
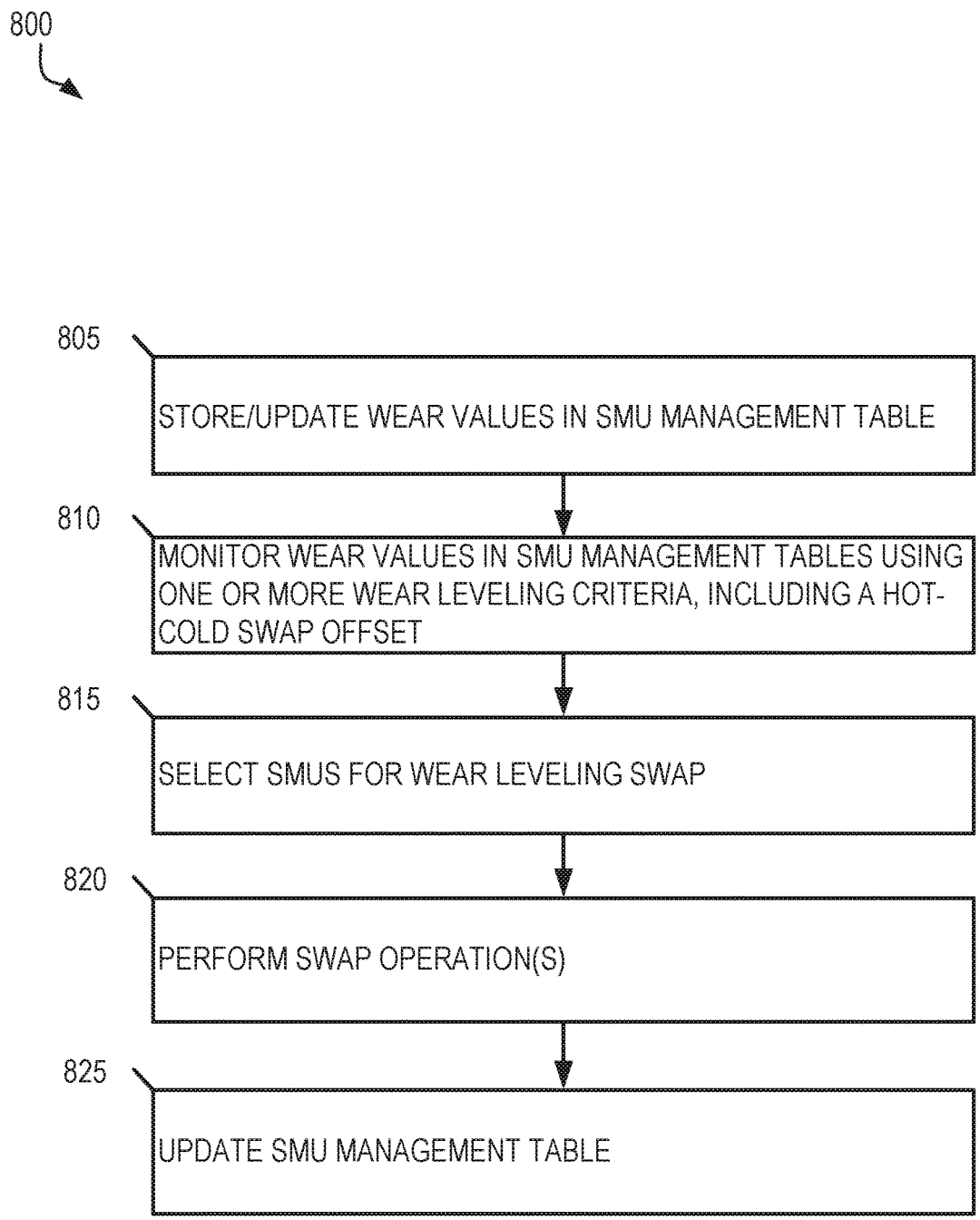
FIG. 8 is a flow diagram of an example method in accordance with some embodiments of the present disclosure.

FIG. 8 is a flow diagram of an example method in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the wear leveling management component 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

In operation 805, the processing device stores or otherwise manages and updates wear values in an SMU management table. Such storage and update operations can, for example, involve read and write operations to a memory element of a memory sub-system used to implement a management table. The wear values are stored for SMUs of the memory devices coupled to the processing device. The wear values include a write count metric value, a fresh write count value, and a base pointer value. Each SMU of the plurality of memory devices is made up of MUs, and each MU for each SMU is made up of memory elements.

In operation 810, the processing device monitors the wear metric values using one or more wear leveling criteria. As described above, the wear leveling criteria includes a hot-cold swap wear leveling criteria with a write count offset value. Following selection of SMUs for wear leveling swap in operation 815, in operation 820, the processing device selects, based on a first write count value of a first SMU and a second write count value of a second SMU, the first SMU and the second SMU for a wear leveling swap operation. Then, in operation 825, the processing device performs the wear leveling swap operation with a whole SMU read operation of the first SMU to read a set of data, and a whole SMU write operation to write the set of data to the second SMU.

Particularly for systems with only a single hot-cold swap criterion, such as those described in method 700 above, the wear leveling operations are limited to low complexity operations with a single basic mechanism for wear leveling using SMU move operations. Some embodiments can thus be configured with only two wear leveling criteria using criteria 1 and criteria 2 above. This limits overhead from intra-SMU management (e.g. managing MUs within SMUs), and limits additional hardware from intra-SMU (e.g. between MUs of a single SMU or multiple SMUs) operations that are excluded from such embodiments.

In such embodiments, write amplification and SMU write count differences a targetable using the hot-cold swap offset and the hot-cold swap threshold value. As described above, write amplification is the number of physical write counts for an SMU (e.g., the actual number of writes) divided by the number of logical writes for an SMU (e.g., the writes responsive to host requests). As the write amplification value increases, fewer of the total write operations for a memory component are used for the intended purpose (e.g., supporting a host deployment such as laptop computer operation, automotive competing, etc.) and more are used for internal management (e.g., wear leveling). A write amplification value of 1.2, for example results in an extra 20% total reads and writes beyond the reads and writes used for host service. Also, write amplification is constant for all kinds of workloads.

The SMU write count differences refers to the delta between the highest total write count value for an SMU in an SMU management table, and the lowest total write count value for an SMU in the table. For example, if an SMU management table has metadata for five SMUs, with the total write count for the corresponding SMUs stored as 200000, 300000, 350000, 150000, and 400000, the SMU write count difference value for the set of SMUs would be 250000, which is the difference between 400000 and 150000.

By using non-zero positive tunable write count offset value in the hot-cold swap criteria, hot-cold swaps occur less frequently, since the FWC value that initiates hot-cold swap operations is reset when a hot-cold swap operation occurs for the SMU, delaying the time when the hot-cold swap criteria would be met. Accordingly, with properly tuned hot-cold swap offset and hot-cold swap threshold values, the write amplification for a memory device is reduced.

In some embodiments, the hot-cold swap offset and the hot-cold swap threshold value are tuned together to target a write amplification performance value for the memory devices. In some such embodiments, this tuning is further done to target a management group write difference performance value for the plurality of management groups of the memory devices.

For a sequential workload, because the operations are relatively evenly distributed across the logical operation space of the memory component, some embodiments can set the hot-cold swap offset so that is rarely or never triggered. Additionally, while some embodiments do not use explicit wear leveling criteria for MUs to manage the write variations that occur within MUs, in some embodiments, randomized selection of the SMU base pointer can provide sufficient variation within an SMU to limit drastic differences between MUs in an SMU that could lead to device failure (e.g., from a first MU hitting the maximum write count and failing long before another MU of the same SMU).

Figure 9:
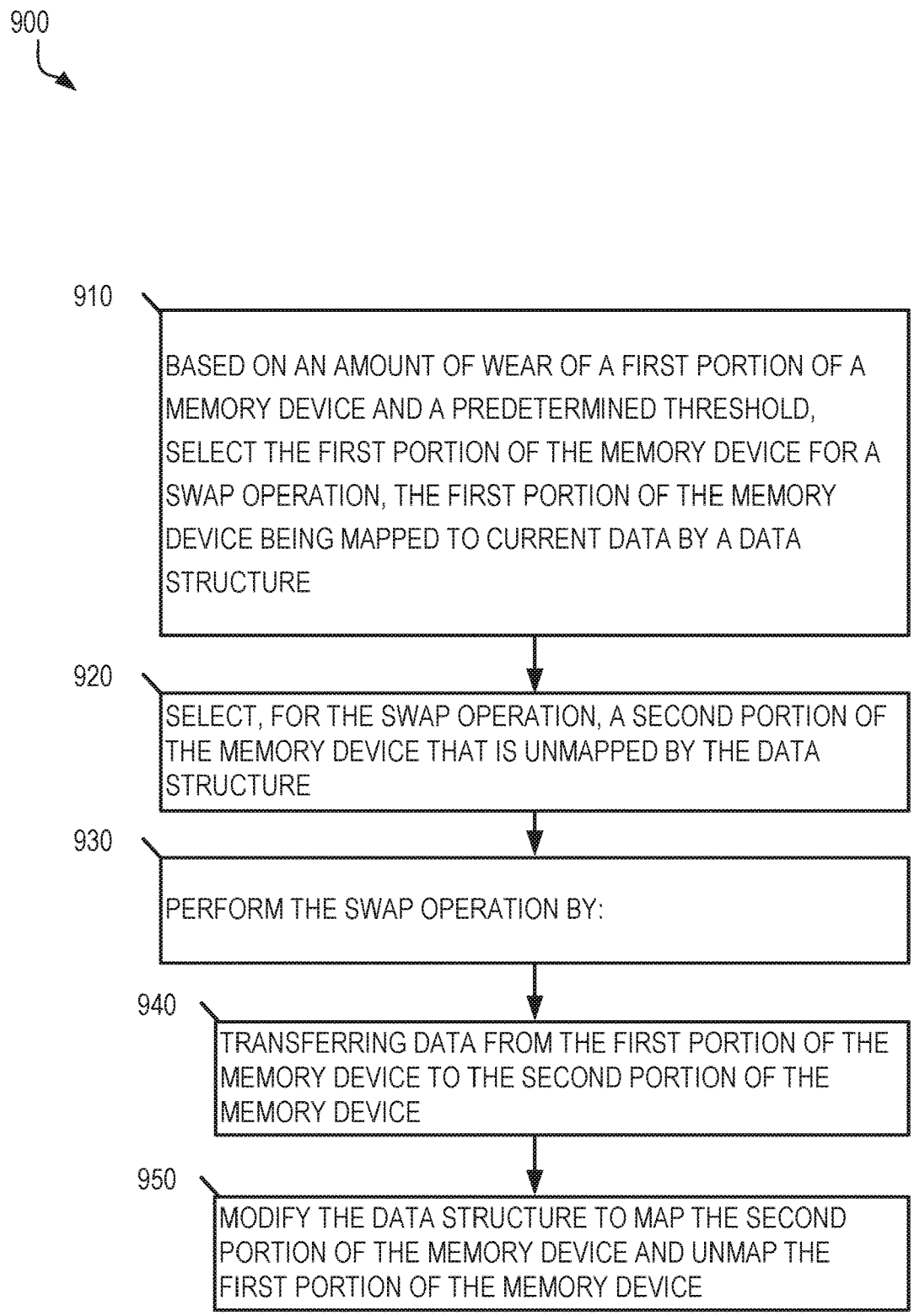
FIG. 9 is a flow diagram of an example method in accordance with some embodiments of the present disclosure.

FIG. 9 is a flow diagram of an example method 900 in accordance with some embodiments of the present disclosure. The method 900 includes operations 910, 920, 930, 940, and 950. By way of example and not limitation, the method 900 is described as being performed by the wear leveling management component 113 in the memory sub-system 110, using the SMU data table 400.

In operation 910, the wear leveling management component 113 selects, based on an amount of wear of a first portion of a memory device (e.g., an SMU) and a predetermined threshold, the first portion of the memory device for a hot-cold swap operation, the first portion of the memory device being mapped to current data by a data structure. For example, the wear leveling management component 113 may access the SMU write count 420 or the SMU FWC 430 of the SMU data table 400 to determine the total wear on an SMU since fabrication or being mapped to current data. In some example embodiments, the wear is compared to the threshold, causing selection of an SMU with at least the threshold amount of wear. For example, the criterion of operation 704 of the method 700 may be applied.

The wear leveling management component 113 selects, for the hot-cold swap operation, a second portion of the memory device (e.g., an SMU) that is unmapped by the data structure (operation 920). For example, the wear leveling management component 113 may access the SMU write count 420 and the SMU mapped/unmapped 440 of the SMU data table 400 to select an unmapped SMU with the lowest amount of wear among unmapped SMUs.

In operation 930, the wear leveling management component 113 performs the swap operation by transferring data from the first portion of the memory device to the second portion of the memory device (operation 940) and modifying the data structure to map the second portion of the memory device and unmap the first portion of the memory device (operation 950). For example, data from a first SMU may be read (e.g., the entirety of the first SMU may be read) and the read data may be written to a second SMU. The SMU data table 400 is modified to indicate that the second SMU now "hot" and is being used to actively store data and the first SMU is now "cold," and is not storing data.

Figure 10:
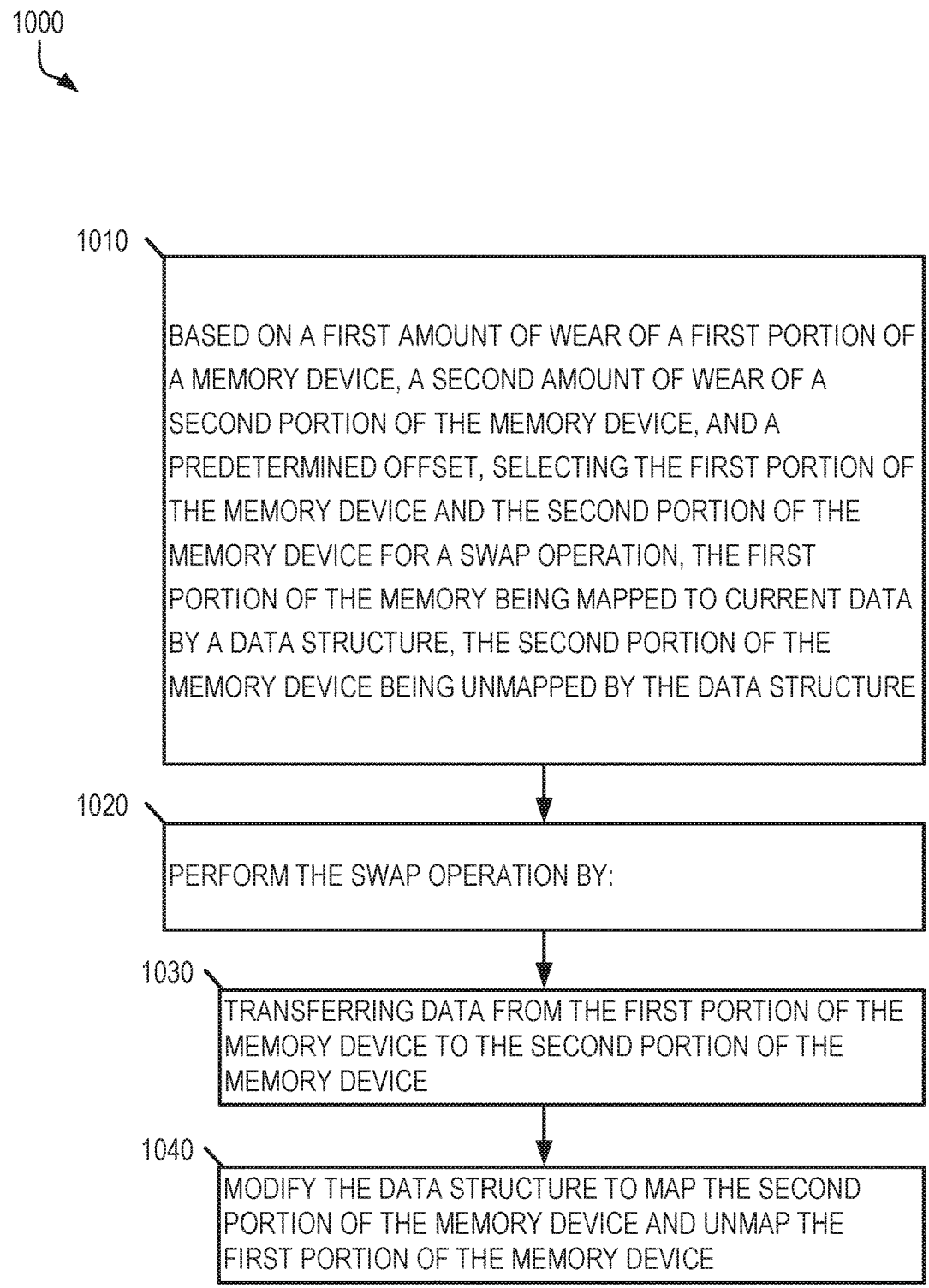
FIG. 10 is a flow diagram of an example method in accordance with some embodiments of the present disclosure.

FIG. 10 is a flow diagram of an example method 1000 in accordance with some embodiments of the present disclosure. The method 1000 includes operations 1010, 1020, 1030, and 1040. By way of example and not limitation, the method 1000 is described as being performed by the wear leveling management component 113 in the memory sub-system 110, using the SMU data table 400.

In operation 1010, the wear leveling management component 113 selects, based on a first amount of wear of a first portion of a memory device (e.g., a first SMU), a second amount of wear of a second portion of the memory device (e.g., a second MSU), and a predetermined offset, the first portion of the memory device and the second portion of the memory device for a swap operation, the first portion of the memory device being mapped to current data by a data structure, the second portion of the memory device being unmapped by the data structure. For example, the wear leveling management component 113 may access the SMU write count 420 or the SMU FWC 430 of the SMU data table 400 to determine the total wear on an SMU since fabrication or being mapped to current data. Additionally, the SMU mapped/unmapped 440 of the SMU data table 400 may be accessed to determine which SMUs are mapped and which are unmapped. In some example embodiments, the offset is subtracted from the first amount of wear, causing selection of a second SMU with at least the offset less wear than the first SMU. For example, the criterion of operation 720 of the method 700 may be applied.

In operation 1020, the wear leveling management component 113 performs the swap operation by transferring data from the first portion of the memory device to the second portion of the memory device (operation 1030) and modifying the data structure to map the second portion of the memory device and unmap the first portion of the memory device (operation 1040). For example, data from a first SMU may be read (e.g., the entirety of the first SMU may be read) and the read data may be written to a second SMU. The SMU data table 400 is modified to indicate that the second SMU now "hot" and is being used to actively store data and the first SMU is now "cold," and is not storing data.

EXAMPLES

Example 1 is a memory system comprising: a memory device; and a memory sub-system controller, operatively coupled with the memory device, and configured to perform operations comprising: based on an amount of wear of a first portion of the memory device and a predetermined threshold, selecting the first portion of the memory device for a swap operation, the first portion of the memory device being mapped to current data by a data structure; selecting, for the swap operation, a second portion of the memory device that is unmapped by the data structure; and performing the swap operation by: transferring data from the first portion of the memory device to the second portion of the memory device; and modifying the data structure to map the second portion of the memory device and unmap the first portion of the memory device.

Example 2 comprises the subject matter of Example 1, wherein: the amount of wear of the first portion of the memory device is based on a number of accesses of the first portion of the memory device after the first portion of the memory device was mapped to current data by the data structure.

Example 3 comprises the subject matter of Example 2, wherein: the selecting of the first portion of the memory device is further based on a second amount of wear of the first portion of the memory device, the second amount of wear being based on a number of accesses of the first portion of the memory device since fabrication of the memory device.

Example 4 comprises the subject matter of any one of Examples 1-3, wherein: the amount of wear of the first portion of the memory device is based on a weighted sum of a number of writes to the first portion of the memory device and a number of reads to the first portion of the memory device, the number of writes and the number of reads being measured after the first portion of the memory device was mapped to current data by the data structure, a first weight for the number of writes being different from a second weight for the number of reads, the first weight and the second weight each having a positive value.

Example 5 comprises the subject matter of any one of Examples 1-4. The memory system of claim 1, wherein the operations further comprise: modifying the data structure to indicate a number of accesses of the second portion of the memory device since being mapped is zero.

Example 6 is a method comprising: based on an amount of wear of a first portion of a memory device and a predetermined threshold, selecting the first portion of the memory device for a swap operation, the first portion of the memory device being mapped to current data by a data structure; selecting, for the swap operation, a second portion of the memory device that is unmapped by the data structure; and performing the swap operation by: transferring data from the first portion of the memory device to the second portion of the memory device; and modifying the data structure to map the second portion of the memory device and unmap the first portion of the memory device.

Example 7 comprises the subject matter of Example 6, wherein: the amount of wear of the first portion of the memory device is based on a number of accesses of the first portion of the memory device after the first portion of the memory device was mapped to current data by the data structure.

Example 8 comprises the subject matter of Example 7, wherein: the selecting of the first portion of the memory device is further based on a second amount of wear of the first portion of the memory device, the second amount of wear being based on a number of accesses of the first portion of the memory device since fabrication of the memory device.

Example 9 comprises the subject matter of any one of Examples 6-8, wherein: the amount of wear of the first portion of the memory device is based on a weighted sum of a number of writes to the first portion of the memory device and a number of reads to the first portion of the memory device, the number of writes and the number of reads being measured after the first portion of the memory device was mapped to current data by the data structure, a first weight for the number of writes being different from a second weight for the number of reads, the first weight and the second weight each having a positive value.

Example 10 comprises the subject matter of any one of Examples 6-9, further comprising: modifying the data structure to indicate a number of accesses of the second portion of the memory device since being mapped is zero.

Example 11 is a memory system comprising: a memory device; and a memory sub-system controller, operatively coupled with the memory device, and configured to perform operations comprising: based on a first amount of wear of a first portion of the memory device, a second amount of wear of a second portion of the memory device, and a predetermined offset, selecting the first portion of the memory device and the second portion of the memory device for a swap operation, the first portion of the memory device being mapped to current data by a data structure, the second portion of the memory device being unmapped by the data structure; and performing the swap operation by: transferring data from the first portion of the memory device to the second portion of the memory device; and modifying the data structure to map the second portion of the memory device and unmap the first portion of the memory device.

Example 12 comprises the subject matter of Example 11, wherein: the selecting of the first portion of the memory device comprises determining that the first portion of the memory device has greater wear than all other mapped portions of the memory device.

Example 13 comprises the subject matter of Example 11 or Example 12, wherein: the selecting of the second portion of the memory device comprises determining that the second portion of the memory device has less wear than all other unmapped portion of the memory device.

Example 14 comprises the subject matter of any one of Examples 11-13, wherein: the first amount of wear of the first portion of the memory device is based on a first number of accesses of the first portion of the memory device since fabrication of the memory device; and the second amount of wear of the second portion of the memory device is based on a second number of accesses of the second portion of the memory device since fabrication of the memory device.

Example 15 comprises the subject matter of any one of Examples 11-14, wherein: the first amount of wear of the first portion of the memory device is based on a weighted sum of a number of writes to the first portion of the memory device and a number of reads to the first portion of the memory device, the number of writes and the number of reads being measured since fabrication of the memory device, a first weight for the number of writes being different from a second weight for the number of reads, the first weight and the second weight each having a positive value.

Example 16 comprises the subject matter of any one of Examples 11-15, wherein the operations further comprise: modifying the data structure to indicate a number of accesses of the second portion of the memory device since being mapped is zero.

Example 17 is a method comprising: based on a first amount of wear of a first portion of a memory device, a second amount of wear of a second portion of the memory device, and a predetermined offset, selecting the first portion of the memory device and the second portion of the memory device for a swap operation, the first portion of the memory device being mapped to current data by a data structure, the second portion of the memory device being unmapped by the data structure; and performing the swap operation by: transferring data from the first portion of the memory device to the second portion of the memory device; and modifying the data structure to map the second portion of the memory device and unmap the first portion of the memory device.

Example 18 comprises the subject matter of Example 17, wherein: the selecting of the first portion of the memory device comprises determining that the first portion of the memory device has greater wear than all other mapped portions of the memory device.

Example 19 comprises the subject matter of Example 17 or Example 18, wherein: the selecting of the second portion of the memory device comprises determining that the second portion of the memory device has less wear than all other unmapped portions of the memory device.

Example 20 comprises the subject matter of any one of Examples 17-19, wherein: the first amount of wear of the first portion of the memory device is based on a first number of accesses of the first portion of the memory device since fabrication of the memory device; and the second amount of wear of the second portion of the memory device is based on a second number of accesses of the second portion of the memory device since fabrication of the memory device.

Example 21 comprises the subject matter of any one of Examples 17-20, wherein: the first amount of wear of the first portion of the memory device is based on a weighted sum of a number of writes to the first portion of the memory device and a number of reads to the first portion of the memory device, the number of writes and the number of reads being measured since fabrication of the memory device, a first weight for the number of writes being different from a second weight for the number of reads, the first weight and the second weight each having a positive value.

Example 22 comprises the subject matter of any one of Examples 17-21, further comprising: modifying the data structure to indicate a number of accesses of the second portion of the memory device since being mapped is zero.

Figure 11:
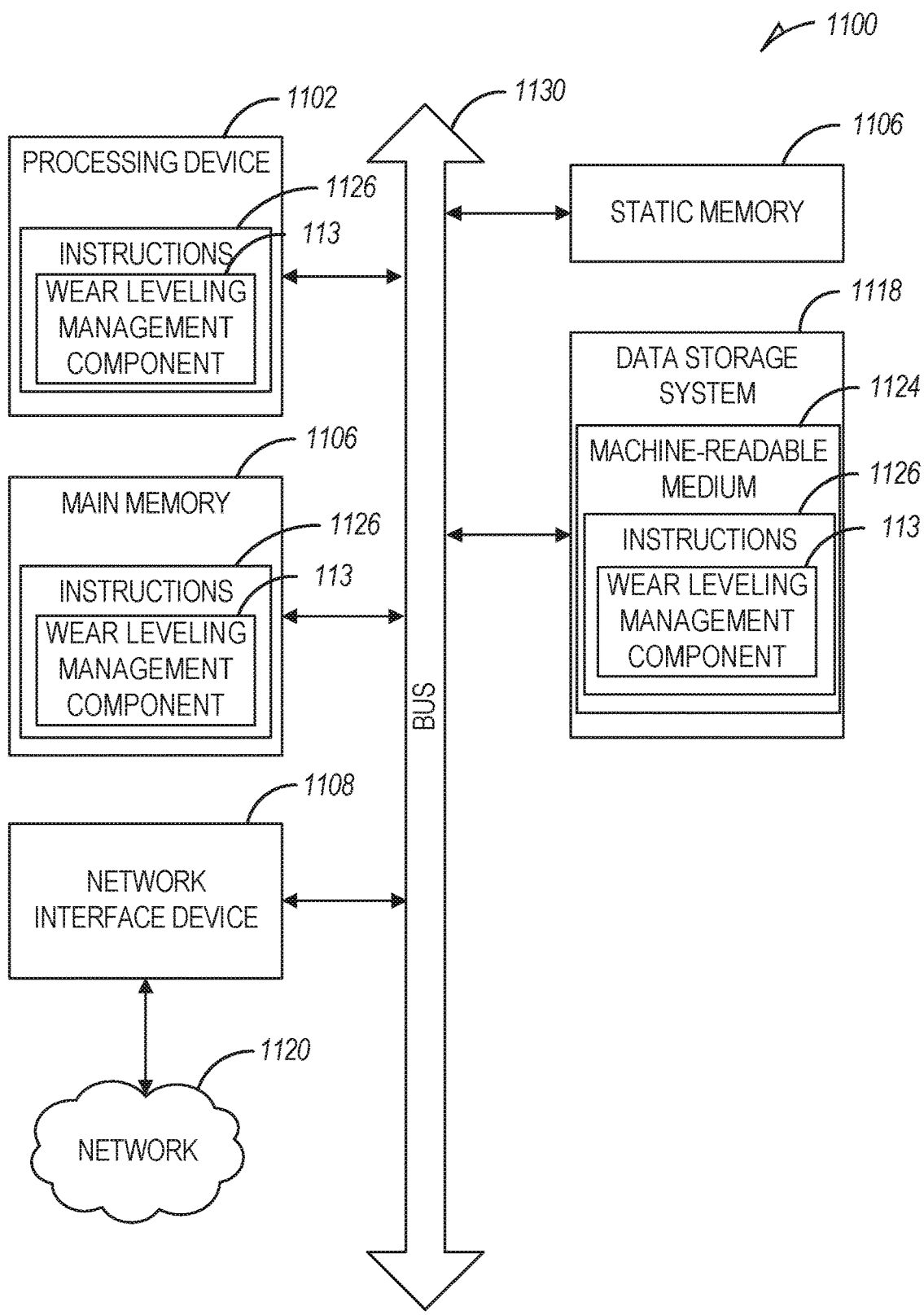
FIG. 11 is a block diagram of an example computer system in which embodiments of the present disclosure may operate.

FIG. 11 illustrates an example machine of a computer system 1100 within which a set of instructions, for causing the machine to perform any one or more of the methodologies discussed herein, can be executed. In some embodiments, the computer system 1100 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the wear leveling management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or RDRAM, etc.), a static memory 1106 (e.g., flash memory, static random access memory (SRAM), etc.), and a data storage system 1118, which communicate with each other via a bus 1130.

Processing device 1102 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein. The computer system 1100 can further include a network interface device 1108 to communicate over the network 1120.

The data storage system 1118 can include a machine-readable storage medium 1124 (also known as a computer-readable medium) on which is stored one or more sets of instructions 1126 or software embodying any one or more of the methodologies or functions described herein. The instructions 1126 can also reside, completely or at least partially, within the main memory 1104 and/or within the processing device 1102 during execution thereof by the computer system 1100, the main memory 1104 and the processing device 1102 also constituting machine-readable storage media. The machine-readable storage medium 1124, data storage system 1118, and/or main memory 1104 can correspond to the memory sub-system 110 of FIG. 1.

In one embodiment, the instructions 1126 include instructions to implement functionality corresponding to a wear leveling management component (e.g., the wear leveling management component 113 of FIG. 1). While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:
a memory device; and
a memory sub-system controller, operatively coupled with the memory device, and configured to perform operations comprising:
determining to perform a hot-cold swap based on a minimum write count value of first write count values for a first set of mapped management groups exceeds, by more than a predetermined offset, a minimum write count value of second write count values for a second set of unmapped management groups;
in response to the determining to perform the hot-cold swap, selecting a first management group of the first set and a second management group of the second set for a swap operation; and
performing the swap operation by:
transferring data from the first management group to the second management group; and
modifying a mapping data structure to map the second management group and unmap the first management group, wherein the mapping data structure comprises, for each management group of the first set and each management group of the second set, a fresh write count that indicates a number of writes since a hot-cold swap was performed.

2. The memory system of claim 1, wherein:
the selecting of the second management group comprises determining that the second management group has less wear than all other management groups in the second set.

3. The memory system of claim 1, wherein:
the first write count values and the second write count values are based on writes since fabrication of the memory device.

4. The memory system of claim 1, wherein the operations further comprise:
modifying the mapping data structure to indicate that a number of accesses of the second management group since being mapped is zero.

5. The memory system of claim 1, wherein the predetermined offset is tuned to reduce write amplification of the memory device.

6. The memory system of claim 1, wherein the memory device is a non-volatile memory device.

7. The memory system of claim 1, wherein the memory device is a cross-point memory device.

8. The memory system of claim 1, wherein the first management group is a block comprising a group of pages.

9. The memory system of claim 1, wherein the operations further comprise:
randomly selecting base pointers for the first set of mapped management groups.

10. The memory system of claim 1, wherein the determining to perform the hot-cold swap comprises checking multiple wear-leveling criteria.

11. A method comprising:
determining to perform a hot-cold swap based on a minimum write count value of first write count values for a first set of mapped management groups exceeds, by more than a predetermined offset, a minimum write count value of second write count values for a second set of unmapped management groups;
in response to the determining to perform the hot-cold swap, selecting a first management group of the first set and a second management group of the second set for a swap operation; and
performing the swap operation by:
transferring data from the first management group to the second management group; and
modifying a mapping data structure to map the second management group and unmap the first management group, wherein the mapping data structure comprises, for each management group of the first set and each management group of the second set, a fresh write count that indicates a number of writes since a hot-cold swap was performed.

12. The method of claim 11, wherein:
the selecting of the second management group comprises determining that the second management group has less wear than all other management groups in the second set.

13. The method of claim 11, wherein:
the first write count values and the second write count values are based on writes since fabrication of a memory device.

14. The method of claim 11, further comprising:
modifying the mapping data structure to indicate that a number of accesses of the second management group since being mapped is zero.

15. The method of claim 11, wherein the predetermined offset is tuned to reduce write amplification of a memory device.

16. The method of claim 11, wherein the hot-cold swap is performed in a non-volatile memory device.

17. The method of claim 11, wherein the hot-cold swap is performed in a cross-point memory device.

18. The method of claim 11, wherein the first management group is a block comprising a group of pages.

19. The method of claim 11, further comprising:
    randomly selecting for the first set of mapped management groups.

20. The method of claim 11, wherein the determining to perform the hot-cold swap comprises checking multiple wear-leveling criteria.

21. The memory system of claim 1, further comprising a super management unit (SMU) data table that includes one or more wear level metrics.

22. The memory system of claim 21, wherein the one or more wear level metrics include, for each SMU, an SMU base pointer and an SMU write count.

\* \* \* \* \*